(12) United States Patent
Ryan

(10) Patent No.: US 9,479,910 B2
(45) Date of Patent: Oct. 25, 2016

(54) SYSTEM AND METHOD FOR REASSIGNING AN ACTIVE MOBILE TELEPHONE CALL FROM DEVICE TO ANOTHER DEVICE

(71) Applicant: Michael C. Ryan, Mitchellville, IA (US)

(72) Inventor: Michael C. Ryan, Mitchellville, IA (US)

(*) Notice: Subject to any disclaimer, the term of this patent is extended or adjusted under 35 U.S.C. 154(b) by 0 days.

(21) Appl. No.: 13/716,181

(22) Filed: Dec. 16, 2012

(65) Prior Publication Data

US 2013/0157636 A1   Jun. 20, 2013

Related U.S. Application Data

(60) Provisional application No. 61/576,557, filed on Dec. 16, 2011.

(51) Int. Cl.
H04W 4/16 (2009.01)

(52) U.S. Cl.
CPC .................... H04W 4/16 (2013.01)

(58) Field of Classification Search
CPC ... H04W 4/026; H04W 68/005; H04W 4/06; H04W 68/005; H04W 4/025
USPC ................................ 455/418, 41.2
See application file for complete search history.

(56) References Cited

U.S. PATENT DOCUMENTS

| | | | |
|---|---|---|---|
| 7,363,006 B2 | 4/2008 | Mooney | |
| 2003/0092451 A1 | 5/2003 | Holloway | |
| 2004/0202300 A1* | 10/2004 | Cooper | H04M 1/72583 379/201.01 |
| 2006/0276213 A1* | 12/2006 | Gottschalk | H04W 4/10 455/518 |
| 2006/0293061 A1* | 12/2006 | Kobayashi | H04L 45/02 455/455 |
| 2007/0032225 A1 | 2/2007 | Konicek | |
| 2007/0121602 A1* | 5/2007 | Sin | H04L 12/6418 370/356 |
| 2008/0032679 A1* | 2/2008 | Purontaus | H04M 3/436 455/417 |
| 2009/0031029 A1 | 1/2009 | Rice | |
| 2009/0163141 A1* | 6/2009 | Chae | H04M 1/7253 455/41.3 |
| 2009/0185554 A1* | 7/2009 | Provenzale | H04W 4/16 370/352 |
| 2009/0280785 A1* | 11/2009 | Chavez | H04M 3/42348 455/415 |
| 2010/0022230 A1* | 1/2010 | Shim | H04M 1/72505 455/417 |

* cited by examiner

*Primary Examiner* — Joseph Dean, Jr.
(74) *Attorney, Agent, or Firm* — Prudens Law LLC; Shawn Diedtrich

(57) ABSTRACT

Systems and methods for reassigning active mobile telephone calls from one device to another device are provided. The systems and methods include receiving and answering a phone call, displaying a list of devices within a short range network, reassigning the telephone call to one of the devices, and disconnecting the call from the transferring device.

2 Claims, 3 Drawing Sheets

SYSTEM AND METHOD FOR REASSIGNING AN ACTIVE MOBILE TELEPHONE CALL FROM DEVICE TO ANOTHER DEVICE

PRIORITY CLAIM

The present invention claims priority to and the benefit of U.S. Provisional Application No. 61/576,557, entitled "Systems and Methods for Reassigning an Active Cell Phone Call to Another Cell Phone(s) in Real Time During the Call Without Interruption To the Call," filed on Dec. 16, 2011 by Inventor Michael C. Ryan, the contents of which are incorporated herein by reference.

BACKGROUND OF THE INVENTION

1. Field of the Invention

The present invention is generally related to mobile telecommunications. More particularly, the present invention pertains to a system and method for reassigning a phone call from one mobile telephone to another mobile telephone.

2. Introduction

Mobile telephones have become central to everyday activities between family members, friends, or business associates. Many times in group settings, mobile telephones are shared between people within the group to accomplish a variety of tasks. Many times when a phone call is answered on one mobile telephone within a group, the caller may want or need to talk with many people within the group. As a result, the mobile telephone is passed from the original owner around to others in the group.

An issue arises when the original owner of the mobile telephone needs the device back or must leave the group. Either the phone call must be ended or the owner must wait for the current phone call to end. Often, another person within the group has a mobile device. However, hanging up and calling another number needlessly disrupts a conversation. What is needed is a method and system to enable easy transfer of an active telephone call to another mobile device.

SUMMARY OF THE INVENTION

While the way in which the present invention addresses the disadvantages of the prior art will be discussed in greater detail below, in general, the present invention are systems and methods for facilitating the transfer of mobile telephone calls from one device to another device.

A method for reassigning an active call to another device comprises the steps of receiving and answering a call on a first wireless device having a display screen, displaying on the display screen a list of wireless devices able to receive the phone call, selecting a second wireless device from the list of wireless devices, reassigning the call from the first wireless device to the second wireless device, upon answer of the reassigned call, disconnecting the call from the first wireless device.

A system for reassigning an active call to another device system comprises a short range network, a cellular network, a first device configured to receive a cellular telephone call and configured to communicate through the short range wireless network, a second device configured to receive a cellular telephone call and configured to communicate through the short range wireless network, wherein the first device and second device have established a telephone phone call through the cellular network, a third device configured to receive a cellular telephone call and configured to communicate through the short range wireless network, wherein the first device, the second device, and the third device are resident on the short range network and wherein the second device transfers the telephone call to the third device.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
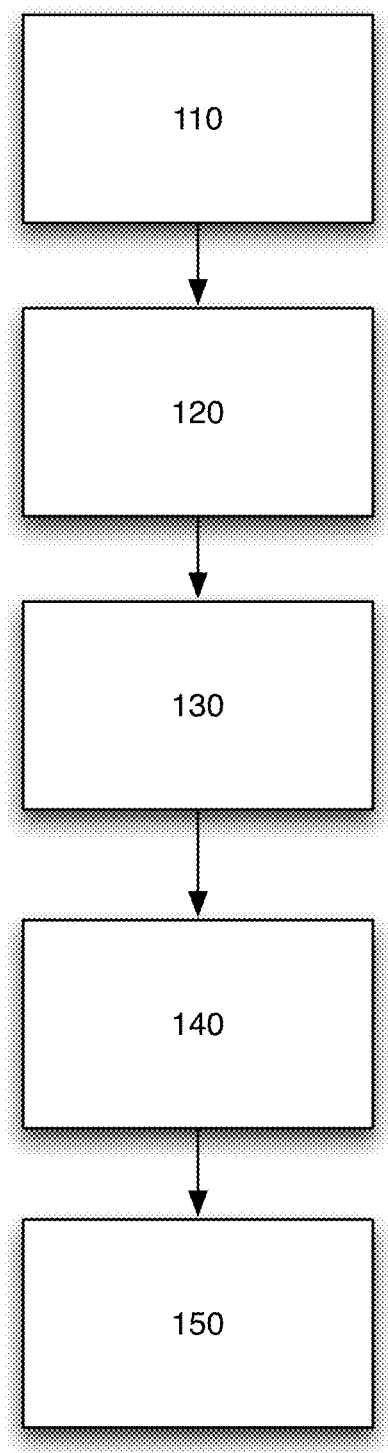
FIG. 1 illustrates an exemplary method for reassigning an active phone call to another device.

Various embodiments of the invention are described in detail below. While specific implementations involving electronic portable or mobile devices (e.g., smart phones) are described, it should be understood that the description here is merely illustrative and not intended to limit the scope of the various aspects of the invention. A person skilled in the relevant art will recognize that other components and configurations may be easily used or substituted than those that are described here without parting from the spirit and scope of the invention.

The present invention facilitates the transfer of mobile telephone calls from one device to another device. In particular, the invention provides a system and method for reassigning an active call to another device. For the sake of brevity, conventional data networking, application development and other functional aspects of the systems (and components of the individual operating components of the systems) may not be described in detail. The connecting lines shown in the various figures are intended to represent exemplary functional relationships and/or physical couplings between various elements. It should be noted that many alternative or additional functional relationships or physical connections may be present in a practical system.

The invention may be described in terms of functional block components, optional selections and various processing steps. It should be appreciated that such functional blocks may be realized by any number of hardware and/or software components configured to perform the specified functions. For example, the invention may employ various integrated circuit components, e.g., memory elements, processing elements, logic elements, audio and/or visual elements, input/output elements, wired or wireless communication techniques, and the like, which may carry out a variety of functions under the control of one or more microprocessors or other control devices.

Similarly, the software elements of the invention may be implemented with any programming, scripting language or web service protocols such as C, C++, C#, Java, COBOL, assembler, and the like. As those skilled in the art will appreciate, the software and hardware elements may be implemented with an operating system such as Microsoft Windows®, Microsoft Mobile, UNIX, Apple OS X, MacOS, Apple iOS, Android, Linux, and the like. Software elements may also include utilizing the services of a cloud-based platform or software as a service (SaaS) to deliver functionality to the various system components.

As will be appreciated by one of ordinary skill in the art, the system may be embodied as a customization of an existing system, an add-on product, upgraded software, a stand alone system, a distributed system, a method, a data processing system, a device for data processing, and/or a computer program product. Accordingly, the system may take the form of an entirely software embodiment, an entirely hardware embodiment, or an embodiment combining aspects of both software and hardware. Furthermore, the system may take the form of a computer program product on a computer-readable storage medium having computer-readable program code means embodied in the storage medium. Any suitable computer-readable storage medium may be utilized, including hard disks, CD-ROM, DVDs, optical storage devices, magnetic storage devices, solid state storage devices and/or the like.

The computer program instructions may be loaded onto a general purpose computer, special purpose computer, or other programmable data processing apparatus to produce a machine, such that the instructions execute on the computer or other programmable data processing apparatus and create means for implementing the functions specified in the flowchart block or blocks. The computer program instructions may also be loaded onto a computer or other programmable data processing apparatus to cause a series of operational steps to be performed on the computer or other programmable apparatus to produce a computer-implemented process such that instructions which execute on the computer or other programmable apparatus provide steps for implementing the functions specified in the flowchart block or blocks.

As used herein, the term "network" shall include any electronic communications means which incorporates both hardware and software components. Communication among the systems may be accomplished through any suitable communication channels, such as, for example, a telephone network, an extranet, an intranet, Internet, portable computer device, personal digital assistant, online communications, satellite communications, off-line communications, wireless communications, transponder communications, local area network, wide area network, networked or linked devices, keyboard, mouse and/or any suitable communication or data input modality. Exemplary embodiments utilize 3G, 4G, 4G LTE or similar communication networks.

Phone devices operating on some networks are assigned unique codes that uniquely identify mobile devices, for example, electronic serial numbers, mobile equipment identifiers, or IP addresses. When a phone call is placed, the unique code is transmitted to a base station or similar device. The unique code is used to validate that the phone device may operate on the particular network. Upon activation of a phone device, the unique code is linked with the phone number of the device.

Today's phone devices also have the ability to operate on a short range wireless network. One phone device may communicate with another phone device over a short range wireless network established between the devices. Such communication is sometimes termed peer-to-peer communications. One exemplary short range network is a Bluetooth network. The Bluetooth network is well known and will not be explained here in detail. Usually the establishment of the short range network is automatic and seamless to the user of the device. In accordance with the principles of the invention, two device are able to utilized the unique codes and short range networks to reassign a telephone call from one device to another device. Once reassigned, the device transferring the call is disconnected.

FIG. 1 illustrates, in block format, a method for reassigning an active phone call to another device. In this method, reassigning an active call to another device comprises the steps of receiving and answering a call on a first wireless device having a display screen 110, displaying on the display screen a list of wireless devices able to receive the phone call 120, selecting a second wireless device from the list of wireless devices 130, reassigning the call from the first wireless device to the second wireless device 140, upon answer of the reassigned call, disconnecting the call from the first wireless device 150. Once a call is disconnected from the transferring device, typical telephone charges cease because the transferring device is no longer involved with the call.

In its embodiments, an incoming telephone call is received and answered at a phone device. Should user want to reassign the telephone call, the user accesses through a user interface and/or display at a device an application configured to display a list of phone devices capable of receiving a transferred telephone call. Such access may be accomplished via touch screen, keyboard or keypad, voice or a combination thereof. The list consists of devices that are available via a short range wireless network, such as Bluetooth, or via another application, for example, a contact or address book. The transferee device could be any device capable of receiving a telephone call, such as a computer configured to communicate over telecommunications networks, and is not limited to phone devices.

In its embodiments, upon a request to transfer a telephone call, the transferring device indicates to a controlling base station or similar device that an active call needs to be transferred. The transferring device indicates to the base station the device(s) to which the call should be transferred. Upon authentication, the base station reassigns the phone call to the requested device(s).

Figure 2:
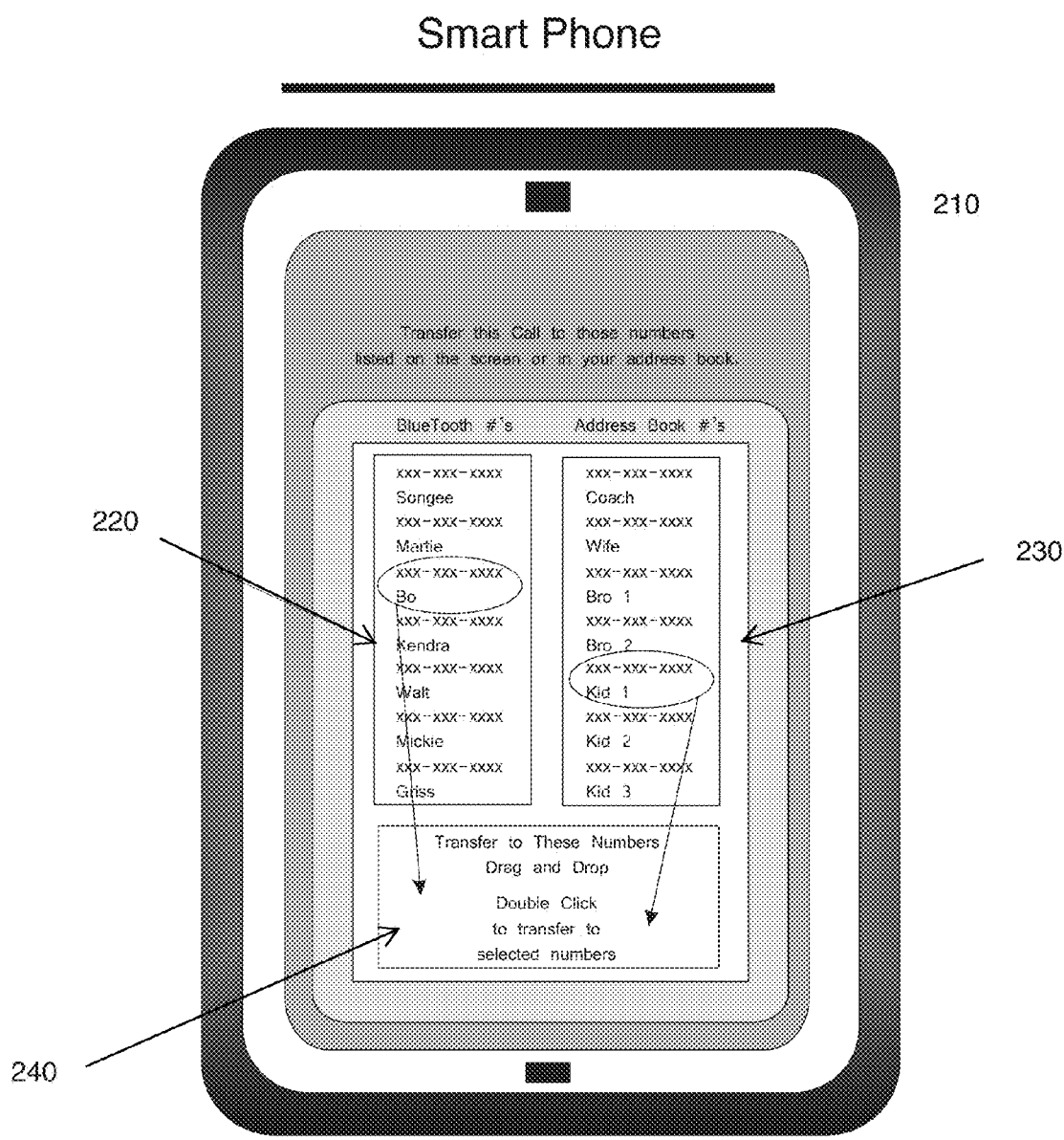
FIG. 2 illustrates an exemplary embodiment of a user interface on a phone device for reassigning an active phone call.

FIG. 2 illustrates an exemplary user interface for reassigning the telephone call. Once a call is received and answered, a user may invoke an application on the phone device 210. Phone numbers associated with devices that are accessible via a short range network 220 or are within the device's address book 230 are displayed. A user selects one or more entries and drags the entries to a transfer window 240. When the user wants to transfer the call, the user indicates the transfers through double-clicking or some other input mechanism, e.g., a stylus.

Figure 3:
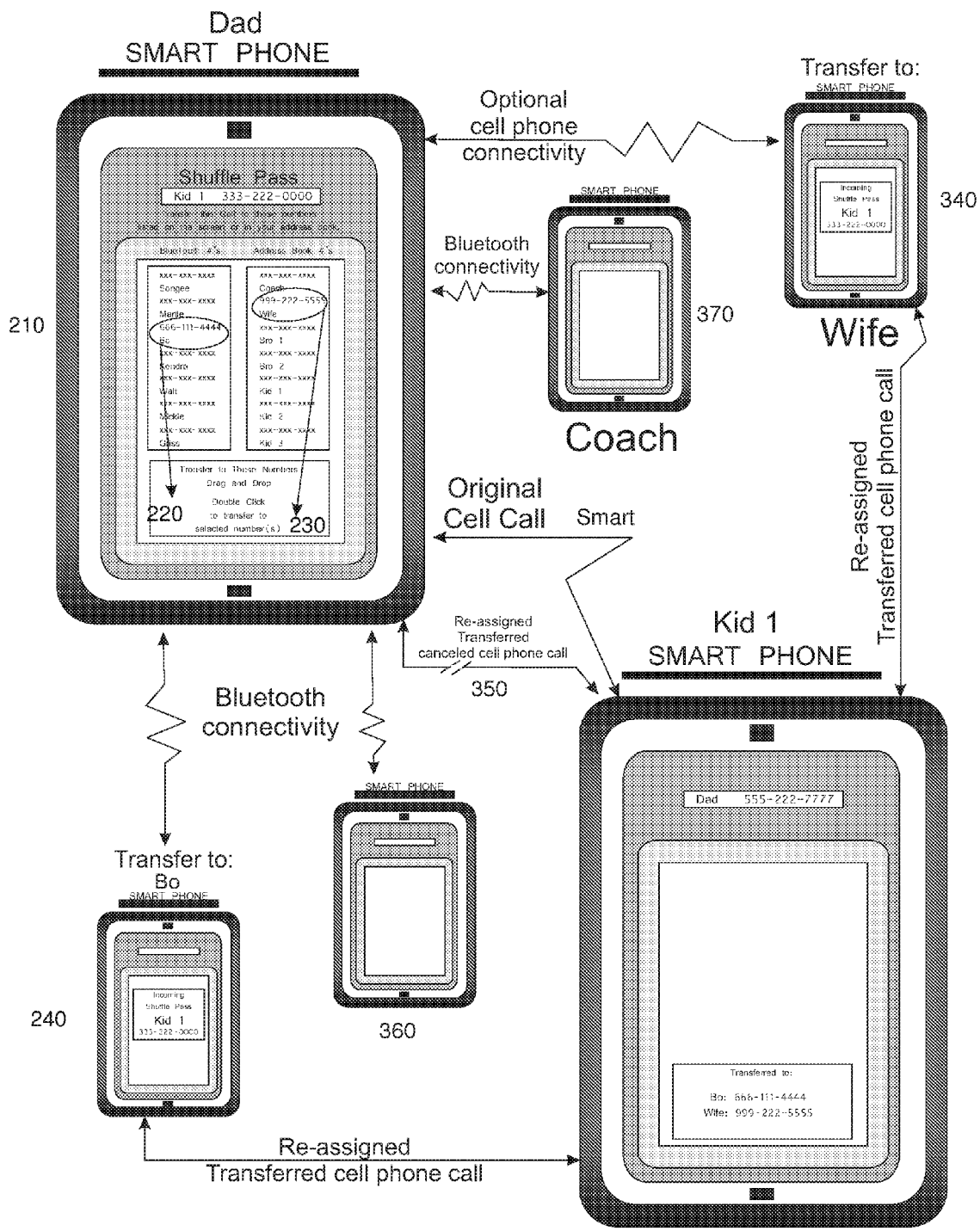
FIG. 3 illustrates an exemplary embodiment of a system for reassigning phone calls between multiple devices.

FIG. 3 illustrates an exemplary embodiment of a system for reassigning phone calls between multiple devices. FIG. 3 reveals five devices (310, 330, 340, 360, and 370) within the short range network of each other and an originating device 320, which is not within the short range network. A phone call 305 is received and active on a first device 310 that is made from the originating device 320. At the time the user of the first device 310 (i.e., Dad) wants to transfer the call, the user selects the transfer application which reveals the devices connected through Bluetooth and devices within an address book. The user selects and drags two entries 315a and 315b to the transfer window. Upon indicating a transfer within the user interface, the calls are reassigned to a second 330 and/or a third device 340. Once the calls are transferred, the original phone call is terminated 350. Although shown as an embodiment transferring a call to two devices, a call could be transferred to any number of devices. Additionally, any type of call, for example, as a person to person call or a conference call, falls within the spirit and scope of the invention.

Although the above description may contain specific details, they should not be construed as limiting the claims in any way. Other configurations of the described embodiments of the invention are part of the scope of this invention. The descriptions and embodiments are not intended to be an exhaustive or to limit the invention to the precise forms disclosed. Accordingly, the appended claims and their legal equivalents should only define the invention, rather than any specific examples given.

What is claimed is:

1. A method for wirelessly reassigning a received and answered cellular telephone call to another device, the method comprising the steps of:
   receiving and answering a cellular telephone call on a second mobile device having a display screen, the cellular telephone call received from a first mobile device;
   displaying on the display screen a list of mobile devices able to receive reassignment of the cellular telephone call over a short range network, wherein the first mobile device, the second mobile device and the mobile devices able to receive assignment of the cellular telephone call are resident on the short range network;
   selecting a third mobile device from the list of devices;
   wirelessly transferring the cellular telephone call from the second mobile device to the third mobile device; and
   upon answer of the transferred telephone call from the second mobile device, disconnecting the cellular telephone call between the first mobile device and the second mobile device.

2. A system for reassigning a cellular telephone call between a first mobile device and answered on a second mobile device to a third mobile device comprising:
   a short range network;
   a cellular network;
   a first mobile device configured to receive a cellular telephone call and configured to communicate through the short range wireless network;
   a second mobile device configured to receive and answer a cellular telephone call and configured to communicate through the short range wireless network, wherein the second mobile device has received and answered a cellular telephone call from the first mobile device through the cellular network;
   a third mobile device configured to receive and answer a cellular telephone call and configured to communicate through the short range wireless network, wherein the first mobile device, the second mobile device, and the third mobile device are resident on the short range network and wherein the second mobile device transfers the cellular telephone call to the third mobile device over the short range network and disconnects the cellular telephone call between the first mobile device and the second mobile device.

* * * * *